United States Patent
Ash et al.

(10) Patent No.: US 6,785,771 B2
(45) Date of Patent: Aug. 31, 2004

(54) METHOD, SYSTEM, AND PROGRAM FOR DESTAGING DATA IN CACHE

(75) Inventors: Kevin John Ash, Tucson, AZ (US); Brent Cameron Beardsley, Tucson, AZ (US); Michael Thomas Benhase, Tucson, AZ (US); Joseph Smith Hyde, II, Tucson, AZ (US); Thomas Charles Jarvis, Tucson, AZ (US); Steven Robert Lowe, Tucson, AZ (US); David Frank Mannenbach, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 10/005,003

(22) Filed: Dec. 4, 2001

(65) Prior Publication Data
US 2003/0105928 A1 Jun. 5, 2003

(51) Int. Cl.$^7$ .............................................. G06F 12/00
(52) U.S. Cl. ........................ 711/136; 711/112; 711/114; 711/133; 711/134; 711/136; 711/143
(58) Field of Search ................................ 711/133, 136, 711/159, 160, 112, 114, 134, 143

(56) References Cited

U.S. PATENT DOCUMENTS

| | | | | |
|---|---|---|---|---|
| 4,875,155 A | * | 10/1989 | Iskiyan et al. | 711/113 |
| 5,542,066 A | * | 7/1996 | Mattson et al. | 711/136 |
| 5,983,318 A | | 11/1999 | Willson et al. | 711/113 |
| 6,145,057 A | | 11/2000 | Arimilli et al. | 711/133 |
| 6,304,946 B1 | * | 10/2001 | Mason, Jr. | 711/143 |
| 6,490,664 B1 | * | 12/2002 | Jones et al. | 711/154 |

* cited by examiner

*Primary Examiner*—Donald Sparks
*Assistant Examiner*—Ngoc V Dinh
(74) *Attorney, Agent, or Firm*—Konrad Raynes & Victor LLP; David W. Victor (57) ABSTRACT

Provided is a method, system, and program for destaging data from a first computer readable medium to a second computer readable medium. A list of entries indicating data blocks in the first computer readable medium is scanned. For each entry scanned, a determination is made as to whether the data block indicated in the scanned entry satisfies a criteria. If the data block indicated in the scanned entry satisfies the criteria, then a destage operation is called to destage the data block in the scanned entry from the first computer readable medium to the second computer readable medium. If the called destage operation is not initiated, then the scanned entry is removed from the cache list. The removed scanned entry is added to one destage wait list. During one destage operation, data blocks indicated in entries in the destage wait list are destaged.

42 Claims, 6 Drawing Sheets

METHOD, SYSTEM, AND PROGRAM FOR DESTAGING DATA IN CACHE

BACKGROUND OF THE INVENTION

1. Field of the Invention

The present invention relates to a method, system, and program for destaging data in cache.

2. Description of the Related Art

A storage subsystem, such as the International Business Machines ("IBM") Enterprise Storage Server ("ESS")**, will receive Input/Output (I/O) requests directed toward an attached storage system. The attached storage system may comprise an enclosure including numerous interconnected disk drives, such as a Direct Access Storage Device (DASD), Redundant Array of Independent Disks (RAID Array), Just A Bunch of Disks (JBOD), etc. If I/O requests are received at a faster rate then they can be processed, then the storage subsystem will queue the I/O requests in a system cache, which may comprise one or more gigabytes of volatile storage, e.g., Random Access Memory (RAM), Dynamic Random Access Memory (DRAM), etc. A copy of certain modified (write) data may also by placed in a non-volatile storage unit (NVS), such as a battery backed-up volatile memory, to provide additional protection of write data in the event of a failure at the storage subsystem.

**IBM and Enterprise Storage Server are trademarks of International Business Machines Crop.

An entry is included in a Least Recently Used (LRU) list for each track in cache. A track can be staged from the storage system to cache to return to a read request. Additionally, write data for a track may be stored in cache before being transferred to the attached storage system. When additional space in cache is needed to buffer additional requested read data and modified data, tracks indicated at the LRU end of the LRU list are destaged to disk. An entry is added to the most recently used (MRU) end of the LRU list for each track added to cache. Each entry in the LRU list comprises a control block that indicates the current status of a track, the location in cache, and the location in the storage system. An additional NVS LRU list is maintained for tracks in the NVS. The cache and NVS LRU lists include entries for tracks in both NVS and cache.

Notwithstanding the use of cache LRU lists to manage destaging operations, there is a need in the art for improved techniques for managing data in cache and performing the destage operation.

SUMMARY OF THE PREFERRED EMBODIMENTS

Provided is a method, system, and program for destaging data from a first computer readable medium to a second computer readable medium. A list of entries indicating data blocks in the first computer readable medium is scanned. For each entry scanned, a determination is made as to whether the data block indicated in the scanned entry satisfies a criteria. If the data block indicated in the scanned entry satisfies the criteria, then a destage operation is called to destage the data block in the scanned entry from the first computer readable medium to the second computer readable medium. If the called destage operation is not initiated, then the scanned entry is removed from the cache list. The removed scanned entry is added to one destage wait list. During one destage operation, data blocks indicated in entries in the destage wait list are destaged.

In further implementations, there are a plurality of destage wait lists, each associated with one of a plurality of criteria used to qualify data blocks for destage. In such case, a determination is made of the destage wait list associated with the criteria used to determine whether to call the destage operation for the data block. The removed scanned entry is added to the determined destage wait list.

In still further implementations, the first computer readable medium comprises a volatile memory used as a cache and the second computer readable medium comprises a non-volatile storage device. Still further, the non-volatile storage device may be configured as a Redundant Array of Independent Disks (RAID) and the criteria may specify one RAID rank in the storage device. In such case, the destage operation is called if the data block indicated in the scanned entry is stored in the specified RAID rank in the storage device.

In further RAID implementations, there are a plurality of destage wait lists, each associated with one RAID rank in the storage device. In such case, a determination is made of the destage wait list associated with the RAID rank specified in the criteria. The removed scanned entry is added to the determined destage wait list for the specified RAID rank.

The described implementations provide techniques for destaging data from a first storage to a second storage, such as from cache to disk, in a manner that uses two lists of entries to manage the destage operations.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Inefficiencies with Current Cache Management Systems

In certain situations, the cache manager will look to destage tracks having a particular characteristic, such as tracks for a particular RAID rank. The cache manager may want to destage tracks for a particular RAID rank if the cache and NVS hold a threshold amount of modified or dirty data for that RAID rank. In the prior art, to destage tracks that satisfy a criteria, such as tracks for a specified RAID rank, the cache manager would spawn an LRU task thread to process the cache LRU list for a period of time from the LRU end upward to locate track entries having modified data for the specified RAID rank. Upon locating an entry in the LRU list for a track that satisfies the criteria, the LRU task thread would call a destage task thread to perform the destage operation of the track from the cache, and NVS if the track is in NVS, to the storage system. If there are no threads available to handle the called destage task, then the LRU task thread would skip that track entry and proceed up the LRU list searching for entries that satisfy the criteria. Upon reaching a subsequent entry in the LRU list, the LRU task thread would again call a destage task thread. With such logic, the LRU task thread may skip numerous qualifying tracks without destaging such tracks because a destage task thread could not be obtained. Thus, if a destage thread is available when the LRU task thread locates a track to destage, that track is destaged. Otherwise, if a destage thread is not available for the destage operation, then that qualifying track is skipped and the LRU task thread proceeds upward through the LRU list to locate tracks to destage until the LRU task thread processing time has expired.

After the LRU task thread expires, the next called LRU task thread would begin processing the LRU list from the LRU end and reconsider entries for tracks that satisfied the destage criteria that were bypassed by the previous LRU task thread. Again, if the destage task thread cannot be obtained upon reaching a qualifying entry that was previously scanned, that qualifying entry would again be skipped by a LRU task thread and have to be rescanned during execution of the next spawned LRU task thread.

The above prior art algorithm for destaging data from cache may not perform the destage when requested and the same qualifying track entries in the LRU lists may be rescanned over and over for destage consideration if a destage task thread cannot be obtained, thereby wasting processing cycles on rescanning the same LRU list entries. Further, because a track is only destaged if a destage task thread can be obtained, tracks are often destaged without regard to their order in the LRU list, thereby destaging newer tracks in cache over the older tracks. Destaging tracks out of LRU order will reduce the likelihood of cache hits and increase cache misses, thereby harming the efficiency of cache operations. Still further, other asynchronous processes may obtain destage task threads before the LRU task thread and continually prevent the LRU task thread from obtaining the destage task thread when rescanning from the bottom of the LRU list. This will increase the likelihood that the LRU task thread will repeatedly bypass entries for qualifying tracks in the LRU list, especially those entries closer to the LRU end of the cache LRU list, before a destage task thread becomes available. Repeatedly bypassing qualifying entries near the LRU end will further exasperate the problem of destaging tracks out of LRU or aging order, such that the oldest tracks are not destaged.

The above problems can have a noticeable impact on cache management operations as the size of the cache reaches gigabyte levels and the cache LRU list can have millions of entries. In such large cache systems, that are common with the larger storage subsystems, thousands of qualifying entries can be continually rescanned due to a failure to obtain a destage task thread when needed.

For these reasons, there is a need in the art for improved techniques for determining tracks to destage.

Using Multiple LRU Lists to Determine Tracks to Destage

Figure 1:
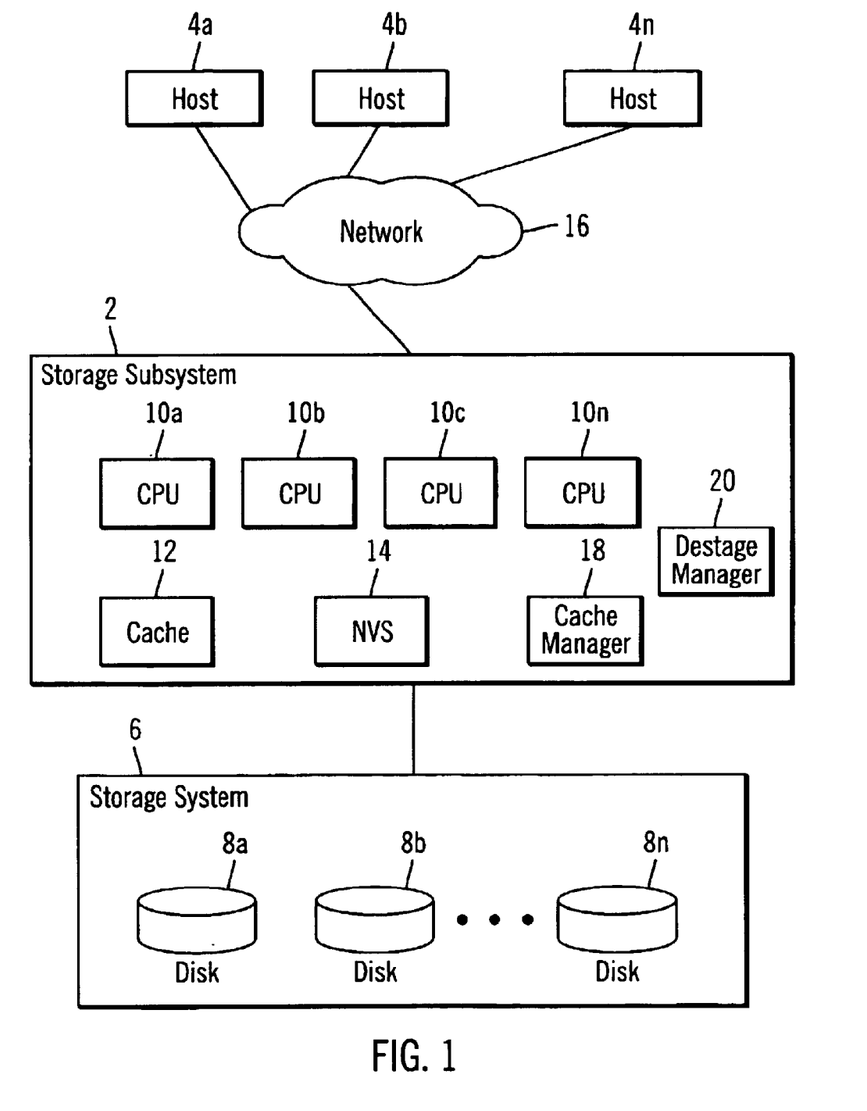
FIG. 1 illustrates a computing environment in which aspects of the invention are implemented.

The described implementations provide a solution to the above problem by utilizing multiple LRU lists to determine tracks to destage. FIG. 1 illustrates a computing environment in which aspects of the invention are implemented. A storage subsystem 2 receives I/O requests from hosts 4a, 4b . . . 4n directed to tracks in a storage system 6, which comprises one or more hard disk drives 8a, 8b . . . 8n. The storage system 6 and disk drives 8a, 8b . . . 8n may be configured as a DASD, one or more RAID ranks, etc. The storage subsystem 2 further includes one or more central processing units (CPUs) 10a, 10b, 10c . . . 10n, a cache 12 comprising a volatile memory to store tracks, and a non-volatile storage unit (NVS) 14 in which certain dirty or modified tracks in cache are buffered. The hosts 4a, 4b . . . 4n communicate I/O requests to the storage subsystem 2 via a network 16, which may comprise any network known in the art, such as a Storage Area Network (SAN), Local Area Network (LAN), Wide Area Network (WAN), the Internet, an Intranet, etc. The cache 12 may be implemented in one or more volatile memory devices and the NVS 14 implemented in one or more high-speed non-volatile storage devices, such as a battery backed up volatile memory.

Figure 2:
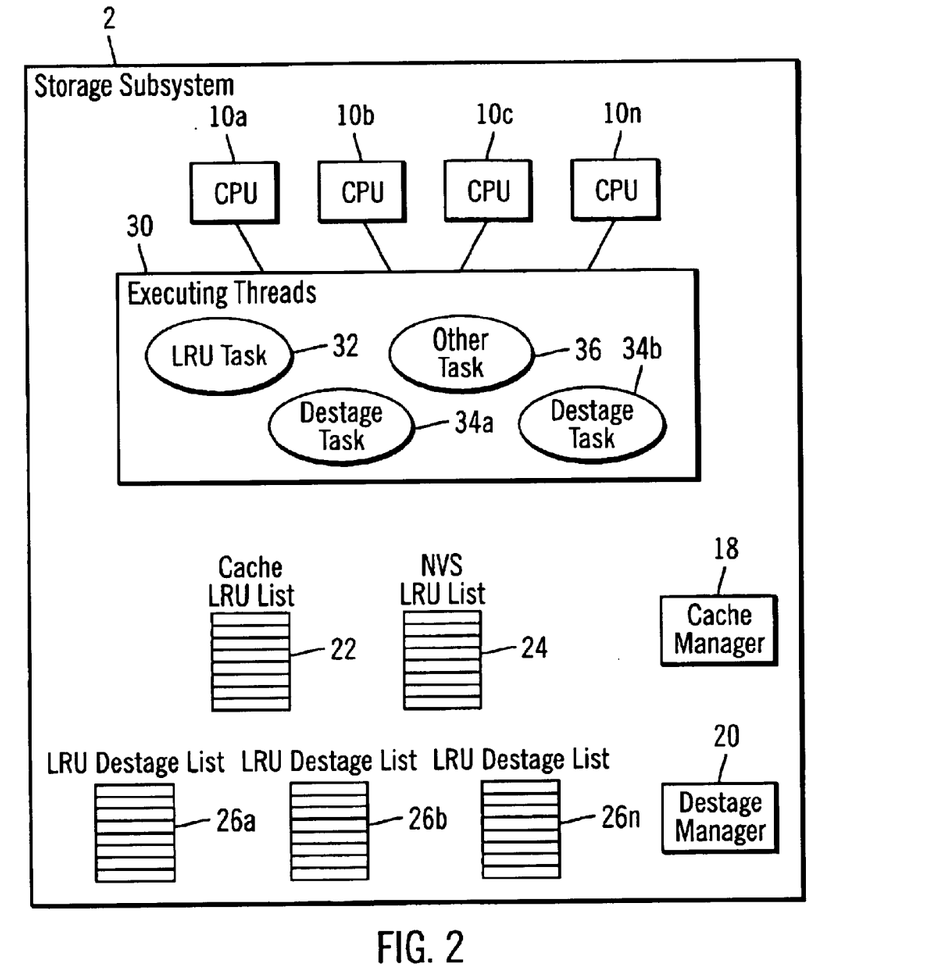
FIG. 2 illustrates program components used to destage data in accordance with implementations of the invention.

A cache manager 18 comprises either a hardware component or process executed by one of the CPUs 10a, 10b . . . 10n that manages the cache 12. A destage manager 20 comprises a software or hardware component that manages destage operations. FIG. 2 illustrates the program components used to implement the cache management operations in implementations where the disks 8a, 8b . . . 8n in the storage system 6 are organized into RAID ranks. FIG. 2 illustrates a cache LRU list 22 in which every track in cache 12 is listed, an NVS list 24 in which every track in the NVS 14 is listed, and one RAID Rank LRU list 26a, 26b . . . 246 for each RAID rank configured in the storage system 6. The CPUs 10a, 10b . . . 10n would execute threads to perform various operations. The executing threads 30 include an LRU task thread 32 that scans the cache LRU list 22 looking for entries for modified tracks that satisfy a certain criteria, such as a track in a specified RAID rank, multiple executing destage threads 34a and 34b that are called to destage a track from cache 12 to the storage system 6, and other threads 36 performing any other storage subsystem 2 operation.

Figure 3:
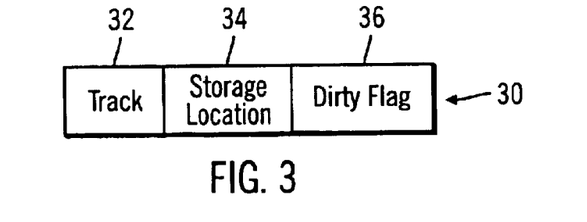
FIG. 3 illustrates the fields in a track entry for tracks in cache in accordance with implementations of the invention.

FIG. 3 illustrates the fields within an LRU entry 30 maintained in the LRU lists 22, 24, 26a, 26b . . . 26n. Each LRU entry 30 includes a track field 32 indicating the track number, a storage location 34 field providing the logical volume, RAID rank or other storage location in which the track is located, and a dirty flag 36 indicating whether the data in cache 12 for the track is modified data.

The LRU destage lists 26a, 26b . . . 26n are used in situations where the cache manager 18 scans the cache LRU list 22 to hold tracks that the LRU task thread 32 bypasses when scanning the LRU list 22 when a destage thread is not available to handle the destage. FIGS. 4–7 illustrates logic implemented in the storage subsystem 2 to destage tracks from cache.

Figure 4:
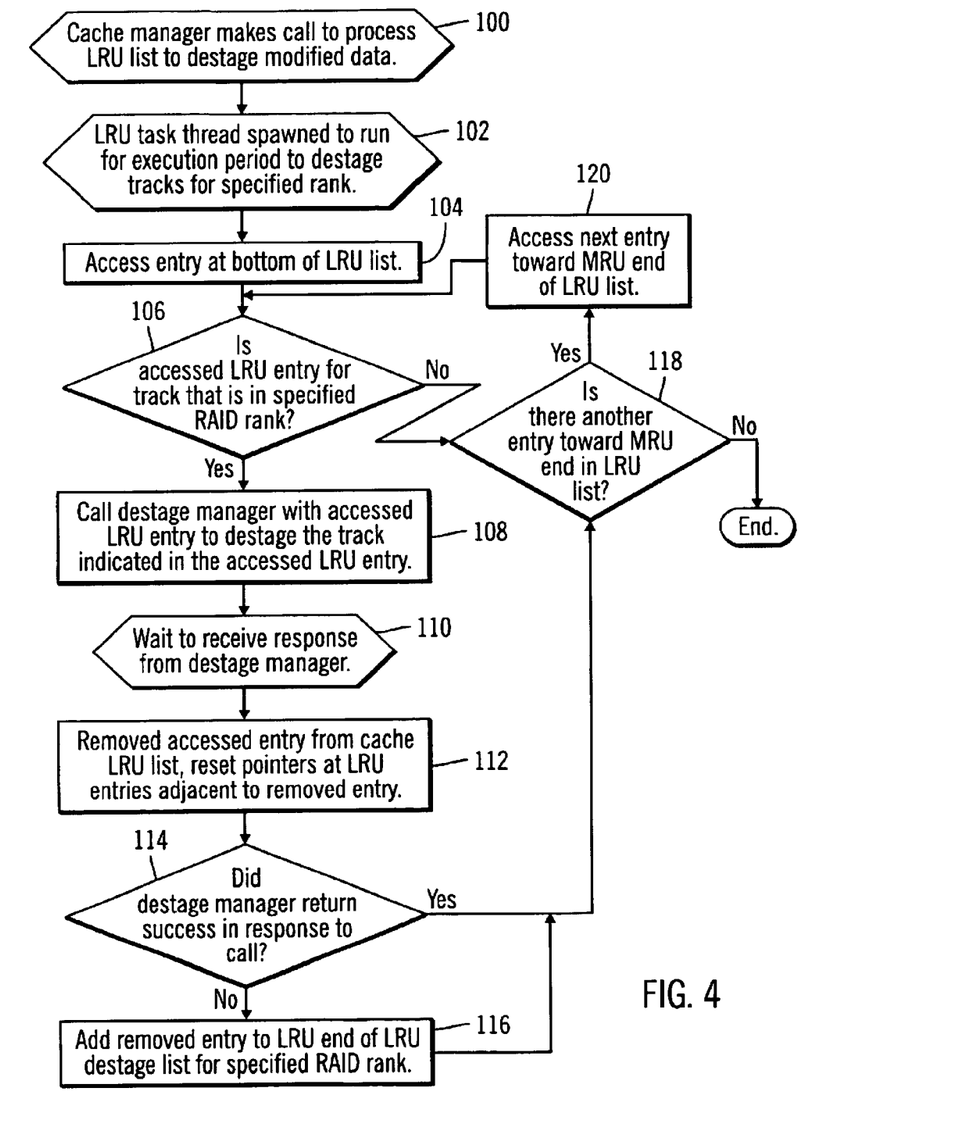
FIGS. 4–7 illustrate logic to destage tracks from cache in accordance with implementations of the invention.

FIG. 4 illustrates logic implemented in the cache manager 18 and an LRU task thread 32 (FIG. 2) to begin the process of destaging tracks from cache 12 if the cache 12 and/or NVS 14 has reached full capacity and additional space is needed for newer tracks. In certain instances, the cache manager 18 may destage modified tracks if a certain threshold of modified tracks in cache 12 has been reached for one particular RAID rank. In FIG. 4, control begins at block 100 with the cache manager 18 calling an LRU task thread 32 to process the cache LRU list 22 to determine tracks in cache 12 to destage. At block 102, the LRU task thread 32 is spawned to run for an execution period, e.g., 300 microseconds, to destage tracks in a specified RAID rank. The LRU task thread 32 performs steps 102 through 120. At block 102, the LRU task thread 32 is spawned to run for an execution period to destage tracks in cache 12 indicated in the cache LRU list 22 entries. The LRU task thread 32 accesses (at block 104) the entry at the bottom or LRU end of the cache LRU list 22. If (at block 106) the accessed LRU entry 30 is for a track in the specified RAID rank, where the RAID rank including the track is indicated in the storage location field 34, then the LRU task thread 32 calls (at block 108) the destage manager 20 to destage the track indicated in the track field 32 of the accessed LRU entry 30. At block 110, the LRU task thread 32 waits to receive a response from the destage manager 20. Upon receiving the response, the LRU task thread 32 removes (at block 112) the accessed LRU entry from the cache LRU list 22 and then resets the pointers at the LRU entries adjacent to the removed LRU entry in the cache LRU list 22 to point to each other.

If (at block 114) the destage manager 20 returns failure in response to the call to destage the track, then the LRU task thread 32 adds (at block 116) the removed LRU entry to the MRU (most recently used) end of the LRU destage list 26a, 26b . . . 26n for the specified RAID rank. If (at block 106) the accessed LRU entry is for a track not in the specified RAID rank or if (at block 114) the destage manager 20 did return success, then a determination is made (at block 118) as to whether there is another LRU entry in the cache LRU list 22 one entry closer to the most recently used (MRU) end of the cache LRU list 22. If so, then the LRU task thread 32 accesses (at block 120) the next entry in the cache LRU list 22 closer to the MRU end and proceeds back to block 106 to consider whether to destage the track for the LRU entry. If there are no further entries in the cache LRU list 22 to consider or the execution time for the LRU task thread 32 expires, then control ends.

Figure 5:
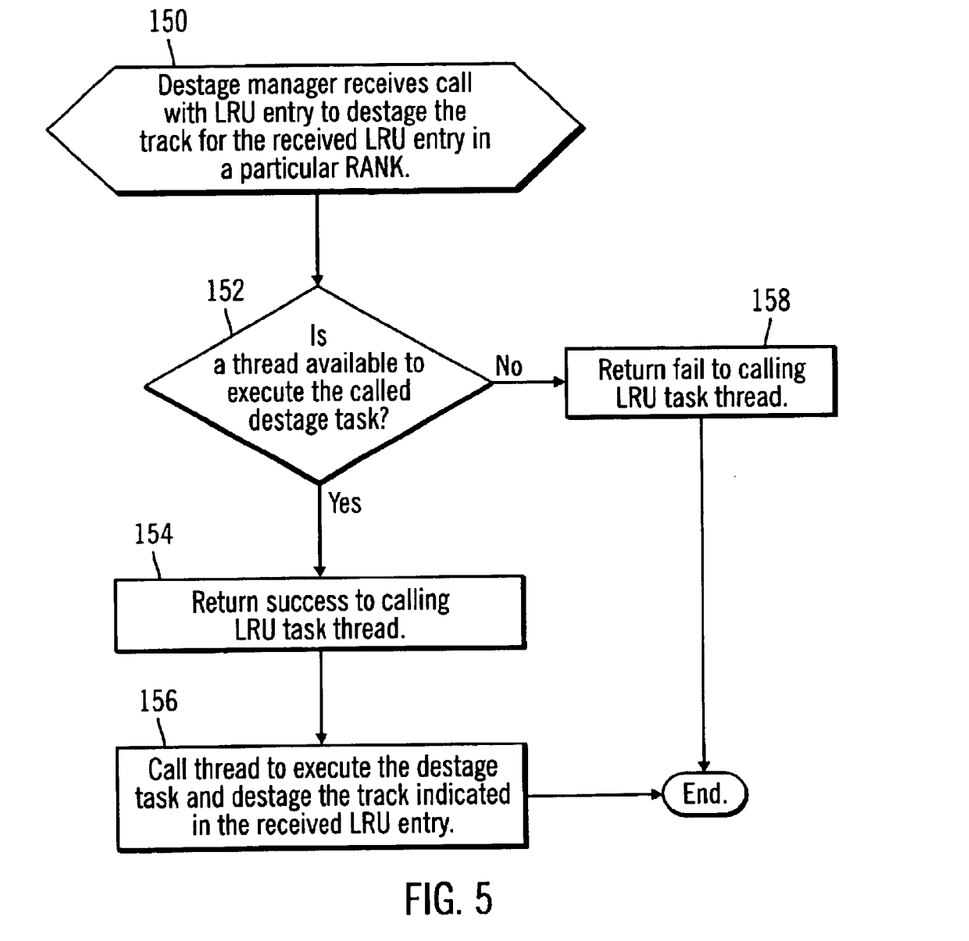

FIG. 5 illustrates logic implemented in the destage manager 20 to call a thread for a destage task 34a, 34b to destage the track indicated in the LRU entry provided in the call from the LRU task thread 32. Control begins at block 150 upon receiving a call to destage a track with one accessed LRU entry from the LRU task thread 32. If (at block 152) a thread is available to execute the destage task, then the destage manager 20 returns (at block 154) success to the calling LRU task thread 32 and then calls (at block 156) a thread to execute the destage task 34a, 34b to destage the track indicated in the LRU track entry received with the call. If (at block 152) a thread is not available, then failure is returned to the calling LRU task thread 32.

Figure 6:
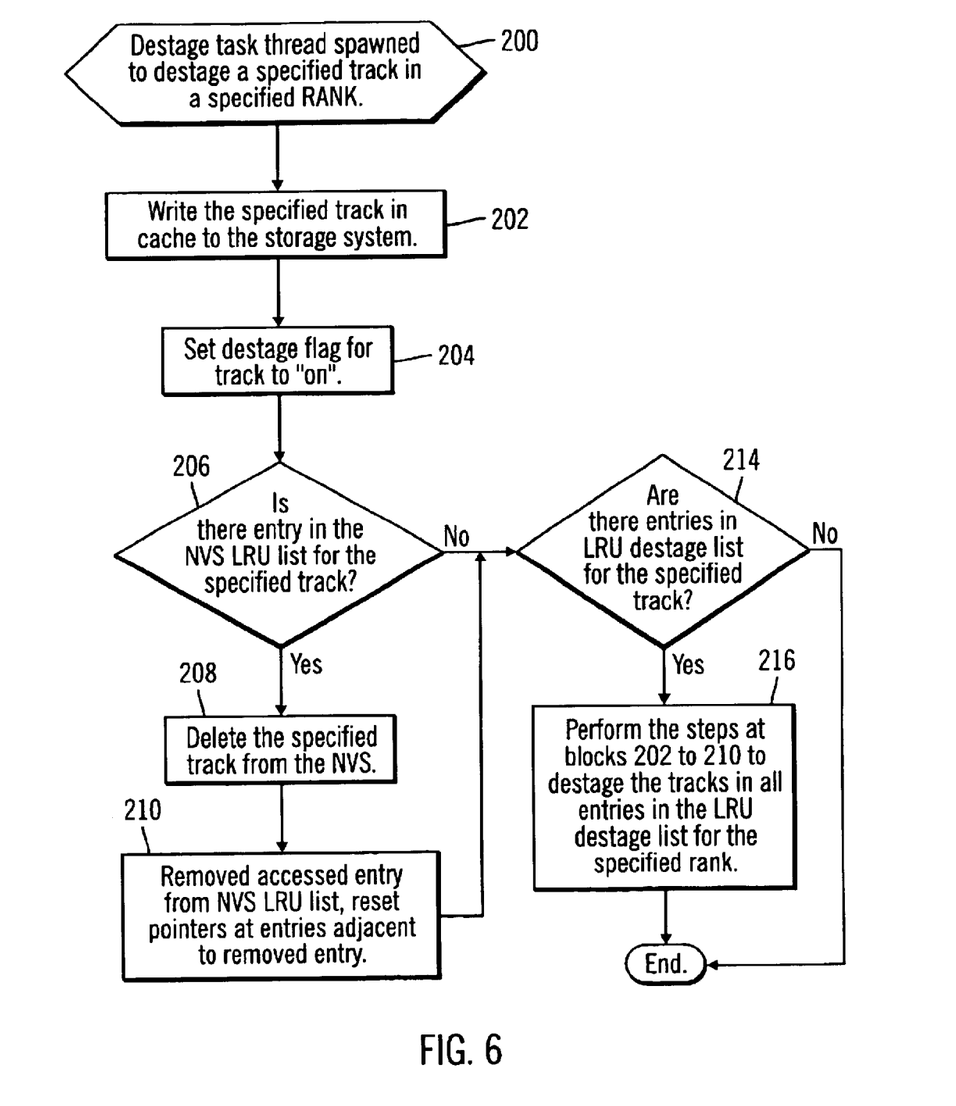

FIG. 6 illustrates logic implemented in a destage task thread 34a, 34b to destage a track from cache 12. In certain implementations, the logic of FIG. 6 is implemented in all destage tasks, whether those destage tasks are spawned in response to a call from the LRU task thread 32 as described with respect to FIGS. 4 and 5 or in response to a call from any other process to destage tracks from cache 12. Control begins at block 200 when the destage task thread 34a, 34b is spawned to destage a track specified in a LRU entry 30 for a specified rank. In response, the destage task thread 34a, 34b writes (at block 202) the specified track from the cache 12 to the storage location in the storage system 6, e.g., RAID rank, indicated in the storage location field 34 and sets (at block 204) a destage flag for the specified track. A subsequent reclaim process would demote that track from cache 12 when additional space is needed in cache 12. In this way, the track having a destage flag set "on" remains in cache 12 and available for read/write hits. If (at block 206) there is an entry for the track deleted from cache 12 in the NVS LRU list 24, then the specified track is deleted (at block 208) from the NVS 14 and the entry for the specified track in the NVS 14 is removed (at block 210), and pointers to the removed entry from adjacent entries in the NVS LRU list 24 are adjusted to point to each other.

After removing the specified track from the cache 12 or cache 12 and NVS 14, from block 206 or 210, the destage task thread 34a, 34b then determines (at block 214) whether there are LRU entries in the LRU destage list 26a, 26b . . . 26n for the specified rank including the track being destaged. If so, then steps 202 through 210 are performed (at block 216) for each entry in the LRU destage list for the specified rank to set for destage entries previously removed from the cache LRU list 22 and moved to the LRU destage list 26a, 26b . . . 26n. With the logic of FIG. 6, any called destage task would process the LRU destage lists 26a, 26b . . . 26n for the specific rank including the track subject to the destage operation in order to destage those qualifying tracks previously processed by the LRU task thread 32 after performing the requested destage operation. The described implementations reduce the delay from when destage is called for a track and the destage is performed by ensuring that those LRU entries bypassed during the initial scan of the cache LRU list 22 by the LRU task 32 are destaged immediately after the next destage task thread 34a, 34b completes current operations. This further ensures that tracks are destaged in accordance with the LRU stacking scheme because the tracks are destaged from the LRU destage lists 26a, 26b . . . 26n in the order in which they would have been destaged from the cache LRU list 22 had threads been available for the called destage tasks.

In implementations where the storage system 6 is configured into RAID ranks, then the destage manager 20 would prefer to gather tracks in order to sequentially write the tracks to the storage system 6 to realize the performance advantages of sequential write operations. In a RAID rank, data is written across multiple disks assigned to the RAID rank to stripe units comprising consecutive blocks on each disk in the RAID rank, where the collection of stripes in disks assigned to the RAID rank form a stride. One stride in the RAID rank would include data as well as parity data for error recovery. The destage manager 20 can optimize destage performance by buffering data for an entire stride before writing the stripes for the stride to the disks 8a, b . . . n because parity for the RAID data need only be calculated once for the entire stripe and then sequentially written to the hard disk drives 8a, b . . . n assigned to the RAID rank. The performance of sequential write operations is substantially better than random or non-sequential writes. For this reason, the destage manager 20 can optimize performance by gathering enough tracks to fill each stripe in the RAID rank stride so that parity for the entire stride can be generated at once and the data and parity can be sequentially written to the disks 8a, 8b . . . 8n assigned to the RAID rank.

Figure 7:
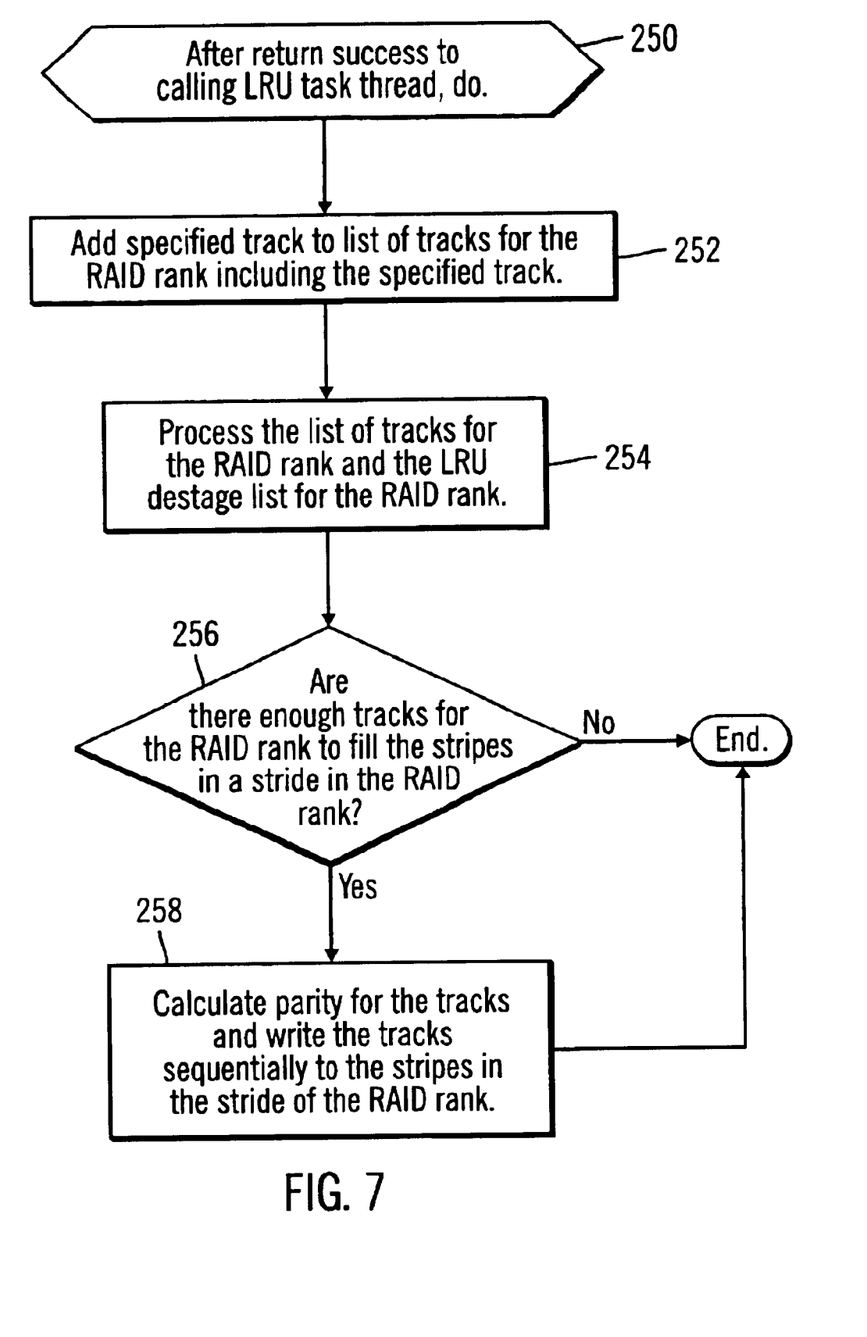

FIG. 7 illustrates alternative logic to the logic of FIG. 6 implemented in the destage manager 20 to destage tracks requested by the LRU task thread 32. After returning success to the calling LRU thread at block 154 n FIG. 5, the destage manager 20 adds (at block 252) the track indicated in the LRU entry to a list of tracks (not shown) to destage for the specified RAID rank. The destage manager 20 then processes (at block 254) the list of tracks for the specified rank with the tracks indicated in the LRU destage list 26a, 26b . . . 26n for the specified RAID rank. If (at block 256) there are a sufficient number of tracks to write tracks to the stripe units in the RAID rank, then the destage manager 20 calculates parity for the stripe units and sequentially writes (at block 258) all the tracks to destage to the stripes in the stride of the specified RAID rank. Otherwise, if there are not enough tracks for the specified RAID rank ready for destage to fill a stride, then the destage manager 20 will further delay destaging the tracks for that specified RAID rank until a sufficient number of tracks are gathered to allow for sequential writing to the stripes of the specified RAID rank.

Additional Implementation Details

The preferred embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

The preferred logic of FIGS. 4–7 describes specific operations occurring in a particular order. In alternative implementations, certain of the logic operations may be performed in a different order, modified or removed. Morever, steps may be added to the above described logic and still conform to the described implementations. Further, operations described herein may occur sequentially or certain operations may be processed in parallel.

In the described implementations, the storage system 6 was configured into a logical array, referred to as a RAID rank. In such case, the logical array would be implemented using storage technology other than RAID, such that the logical array allows a plurality of different storage devices, e.g., disks, tapes, etc., appear as a single storage space to the user.

In the described implementations, the LRU task thread 32 would destage tracks based on the RAID rank in which the track in cache 12 is stored in the storage system 6, such that tracks the LRU task thread 32 bypasses due to failure to call a destage task thread 34a, 34b are added to a LRU destage list 26a, 26b . . . 26n associated with the particular RAID rank including the cache. In alternative implementations, the LRU destage lists may be associated with track characteristics other than RAID rank, such as the disk drive 8a, 8b . . . 8n in which the track is included, type of data in the track, e.g., sequential or non-sequential, etc. In such case, the LRU task thread 32 would scan the cache LRU list 22 for LRU entries that satisfy such alternative criteria to destage to cache 12.

In the described implementations, the disk drives 8a, b, c, d, e comprised magnetic hard disk drives. In alternative implementations, the storage system 6 may comprise any storage system known in the art, such as optical disks, tapes, etc.

In the described implementations, the cache comprised volatile memory and the storage system to which tracks are destaged from cache comprised a non-volatile storage device. In alternative implementations, the cache from which data is destaged and the storage to which destaged data is stored may comprise any volatile or non-volatile computer readable medium known in the art.

In the described implementations, the data was managed as tracks in cache. In alternative implementations, the data may be managed in data units other than cache, such as a logical block address (LBA), etc.

In described implementations, the lists in which entries on tracks in cache comprised LRU lists. In alternative implementations, different type of lists with different ordering schemes may be used.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for destaging data from a first computer readable medium to a second computer readable medium, comprising:

scanning a cache list of entries indicating data blocks in the first computer readable medium;

for each entry scanned, determining whether the data block indicated in the scanned entry satisfies a criteria;

if the data block indicated in the scanned entry satisfies the criteria, then calling for a destage operation to destage the data block in the scanned entry from the first computer readable medium to the second computer readable medium;

if the called destage operation is not initiated, then removing the scanned entry from the cache list;

adding the removed scanned entry to one destage wait list; and destaging data blocks indicated in entries in the destage wait list during one destage operation.

2. The method of claim 1, wherein the cache list and destage wait list comprise Least Recently Used (LRU) lists, and wherein the removed scanned entry is added to a most recently used (MRU) end of the destage wait list.

3. The method of claim 1, further comprising:

executing a destage operation to destage a data block from the first computer readable medium to the second computer readable medium; and after completing the destage operation, scanning entries in the destage wait list to destage data blocks indicated in the scanned entries from the first computer readable medium to the second computer readable medium.

4. The method of claim 1, wherein there are a plurality of destage wait lists, each associated with one of a plurality of criteria used to qualify data blocks for destage, further comprising:

determining the destage wait list associated with the criteria used to determine whether to call the destage operation for the data block, wherein the removed scanned entry is added to the determined destage wait list.

5. The method of claim 4, wherein the executed destage operation is unrelated to the scanning of the cache list for entries satisfying the criteria.

6. The method of claim 4, further comprising:

executing a destage operation to destage a data block from the first computer readable medium to the second computer readable medium; and after completing the destage operation, scanning entries in at least one destage wait list to destage data blocks indicated in the entries in the destage wait list from the first computer readable medium to the second computer readable medium.

7. The method of claim 1, wherein the first computer readable medium comprises a volatile memory used as a cache and wherein the second computer readable medium comprises a non-volatile storage device.

8. The method of claim 7, wherein the non-volatile storage device is configured as a Redundant Array of Independent Disks (RAID), and wherein the criteria specifies one RAID rank in the storage device, wherein the destage operation is called if the data block indicated in the scanned entry is stored in the specified RAID rank in the storage device.

9. The method of claim 8, wherein there are a plurality of destage wait lists, each associated with one RAID rank in the storage device, further comprising: determining the destage wait list associated with the RAID rank including the data block subject to the destage operation, wherein the removed scanned entry is added to the determined destage wait list for the specified RAID rank.

10. The method of claim 8, wherein data blocks subject to destage by the called destage operations are gathered until sufficient data blocks are available to allow for sequential writing of the data blocks subject to the specified RAID rank in the non-volatile storage device, wherein destaging the data blocks gathered for the specified RAID rank further comprises:

sequentially writing the data blocks to stripe units in the RAID rank.

11. The method of claim 1, further comprising:

removing the data block from a third computer readable medium unit used to buffer modified data in the first computer readable medium when the data block is destaged from the first computer readable medium.

12. The method of claim 11, wherein the first computer readable medium comprises a volatile memory used as a cache, wherein the second computer readable medium comprises a non-volatile storage device, and wherein the third computer readable medium comprises a non-volatile storage unit.

13. The method of claim 1, wherein the criteria indicates a storage location of the data block.

14. The method of claim 1, wherein the called destage operation is not initiated if a thread is not available to execute the called destage operation.

15. A system for destaging data. comprising:

a first computer readable medium;

a second computer readable medium;

means for scanning a cache list of entries indicating data blocks in the first computer readable medium;

means for determining, for each entry scanned, whether the data block indicated in the scanned entry satisfies a criteria;

means for calling for a destage operation to destage the data block in the scanned entry from the first computer readable medium to the second computer readable medium if the data block indicated in the scanned entry satisfies the criteria;

means for removing the scanned entry from the cache list if the called destage operation is not initiated;

means for adding the removed scanned entry to one destage wait list; and means for destaging data blocks indicated in entries in the destage wait list during one destage operation.

16. The system of claim 15, wherein the cache list and destage wait cache list comprise Least Recently Used (LRU) lists, and wherein the removed scanned entry is added to a most recently used (MRU) end of the destage wait list.

17. The system of claim 15, further comprising:

means for executing a destage operation to destage a data block from the first computer readable medium to the second computer readable medium; and means for scanning entries in the destage wait cache list to destage data blocks indicated in the scanned entries from the first computer readable medium to the second computer readable medium after completing the destage operation.

18. The system of claim 15, wherein there are a plurality of destage wait lists, each associated with one of a plurality of criteria used to qualify data blocks for destage, further comprising:

means for determining the destage wait list associated with the criteria used to determine whether to call the destage operation for the data block, wherein the removed scanned entry is added to the determined destage wait list.

19. The system of claim 18, wherein the executed destage operation is unrelated to the scanning of the cache list for entries satisfying the criteria.

20. The system of claim 18, further comprising:

executing a destage operation to destage a data block from the first computer readable medium to the second computer readable medium; and after completing the destage operation, scanning entries in at least one destage wait list to destage data blocks indicated in the entries in the destage wait list from the first computer readable medium to the second computer readable medium.

21. The system of claim 15, wherein the first computer readable medium comprises a volatile memory used as a cache and wherein the second computer readable medium comprises a non-volatile storage device.

22. The system of claim 21, wherein the non-volatile storage device is configured as a Redundant Array of Independent Disks (RAID), and wherein the criteria specifies one RAID rank in the storage device, wherein the destage operation is called if the data block indicated in the scanned entry is stored in the specified RAID rank in the storage device.

23. The system of claim 22, wherein there are a plurality of destage wait lists, each associated with one RAID rank in the storage device, further comprising:

means for determining the destage wait list associated with the RAID rank including the data block subject to the destage operation, wherein the removed scanned entry is added to the determined destage wait list for the specified RAID rank.

24. The system of claim 22, wherein data blocks subject to destage by the called destage operations are gathered until sufficient data blocks are available to allow for sequential writing of the data blocks subject to the specified RAID rank in the non-volatile storage device, wherein the means for destaging the data blocks gathered for the specified RAID rank further performs:

sequentially writing the data blocks to stripe units in the RAID rank.

25. The system of claim 15, further comprising:

means for removing the data block from a third computer readable medium unit used to buffer modified data in the first computer readable medium when the data block is destaged from the first computer readable medium.

26. The system of claim 25, wherein the first computer readable medium comprises a volatile memory used as a cache, wherein the second computer readable medium comprises a non-volatile storage device, and wherein the third computer readable medium comprises a non-volatile storage unit.

27. The system of claim 15, wherein the criteria indicates a storage location of the data block.

28. The system of claim 15, wherein the called destage operation is not initiated if a thread is not available to execute the called destage operation.

29. An article of manufacture including code for destaging data from a first computer readable medium to a second computer readable medium, wherein the code is capable of causing operations to be performed comprising:

scanning a cache list of entries indicating data blocks in the first computer readable medium;

for each entry scanned, determining whether the data block indicated in the scanned entry satisfies a criteria;

if the data block indicated in the scanned entry satisfies the criteria, then calling for a destage operation to destage the data block in the scanned entry from the first computer readable medium to the second computer readable medium;

if the called destage operation is not initiated, then removing the scanned entry from the cache list;

adding the removed scanned entry to one destage wait list; and destaging data blocks indicated in entries in the destage wait list during one destage operation.

30. The article of manufacture of claim 29, wherein the cache list and destage wait list comprise Least Recently Used (LRU) lists, and wherein the removed scanned entry is added to a most recently used (MRU) end of the destage wait list.

31. The article of manufacture of claim 29, further comprising:

executing a destage operation to destage a data block from the first computer readable medium to the second computer readable medium; and after completing the destage operation, scanning entries in the destage wait list to destage data blocks indicated in the scanned entries from the first computer readable medium to the second computer readable medium.

32. The article of manufacture of claim 29, wherein there are a plurality of destage wait lists, each associated with one of a plurality of criteria used to qualify data blocks for destage, further comprising:

determining the destage wait list associated with the criteria used to determine whether to call the destage operation for the data block, wherein the removed scanned entry is added to the determined destage wait list.

33. The article of manufacture of claim 32, wherein the executed destage operation is unrelated to the scanning of the cache list for entries satisfying the criteria.

34. The article of manufacture of claim 32, further comprising:

executing a destage operation to destage a data block from the first computer readable medium to the second computer readable medium; and after completing the destage operation, scanning entries in at least one destage wait list to destage data blocks indicated in the entries in the destage wait list from the first computer readable medium to the second computer readable medium.

35. The article of manufacture of claim 29, wherein the first computer readable medium comprises a volatile memory used as a cache and wherein the second computer readable medium comprises a non-volatile storage device.

36. The article of manufacture of claim 35, wherein the non-volatile storage device is configured as a Redundant Array of Independent Disks (RAID), and wherein the criteria specifies one RAID rank in the storage device, wherein the destage operation is called if the data block indicated in the scanned entry is stored in the specified RAID rank in the storage device.

37. The article of manufacture of claim 36, wherein there are a plurality of destage wait lists, each associated with one RAID rank in the storage device, further comprising:

determining the destage wait list associated with the RAID rank including the data block subject to the destage operation, wherein the removed scanned entry is added to the determined destage wait list for the specified RAID rank.

38. The article of manufacture of claim 36, wherein data blocks subject to destage by the called destage operations are gathered until sufficient data blocks are available to allow for sequential writing of the data blocks subject to the specified RAID rank in the non-volatile storage device, wherein destaging the data blocks gathered for the specified RAID rank further comprises:

sequentially writing the data blocks to stripe units in the RAID rank.

39. The article of manufacture of claim 29, further comprising:

removing the data block from a third computer readable medium unit used to buffer modified data in the first computer readable medium when the data block is destaged from the first computer readable medium.

40. The article of manufacture of claim 39, wherein the first computer readable medium comprises a volatile memory used as a cache, wherein the second computer readable medium comprises a non-volatile storage device, and wherein the third computer readable medium comprises a non-volatile storage unit.

41. The article of manufacture of claim 29, wherein the criteria indicates a storage location of the data block.

42. The article of manufacture of claim 29, wherein the called destage operation is not initiated if a thread is not available to execute the called destage operation.

* * * * *